United States Patent

[11] 3,596,690

[72] Inventors Douglas D. Hamilton
 Mount Royal;
 Joseph J. R. Boivin, Montreal, both of, Canada
[21] Appl. No. 840,930
[22] Filed July 11, 1969
[45] Patented Aug. 3, 1971
[73] Assignees Canadian International Paper Company
 Montreal, Quebec, Canada;
 Quebec North Shore Paper Company
 Montreal, Quebec, Canada; Abitibi St.
 Anne Paper Ltd., Beaupre, Quebec,
 Canada, a part interest to each
[32] Priority July 12, 1968
[33] Canada
[31] 15004/68

[54] DELIMBER CUTTERS, DELIMBER AND TREE PROCESSING FEED MEANS
 6 Claims, 16 Drawing Figs.
[52] U.S. Cl. .................................................... 144/2 Z,
  144/3 D, 144/246 R
[51] Int. Cl. ..................................................... A01g 23/02
[50] Field of Search ........................................... 144/2 Z, 3

D, 34, 34 A—E, 309 AC, 246, 246 A—E, 208, 208
D; 143/84, 846

[56] References Cited
 UNITED STATES PATENTS
 3,351,107 11/1967 Hamilton ....................... 144/2 Z Primary Examiner—Gerald A. Dost
Attorney—Jacobi, Davidson, Lilling and Siegel ABSTRACT: A delimber arm for use in delimbing trees and which may be mounted on a frame, the arm being segmented and with the segments resiliently urged into position with respect to one another whereby the arm or several arms open and close like an iris to closely follow the trunk of a tree having relatively wide variations in diameter. A delimber further incorporating delimbing members of the foregoing type and means for feeding a tree or group of trees endwise through the delimber incorporating hydraulic systems for urging the feed rolls against the tree with a force proportional to the force required to propel the tree through the delimber. Further, a tree delimber incorporating a frame having a notch in the upper surface for supporting one or more trees and one or more cutting members pivotally mounted on the frame and arranged to move toward and away from the recess in the frame for removing limbs from trees moved relative thereto.

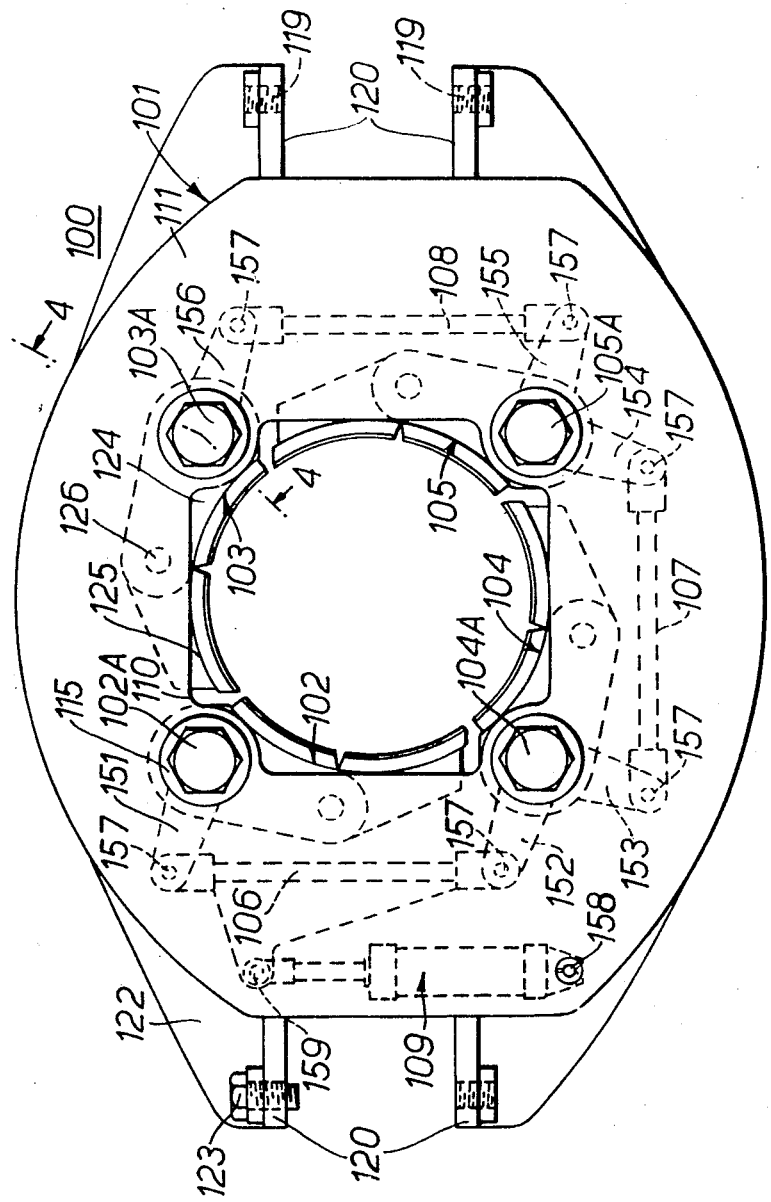

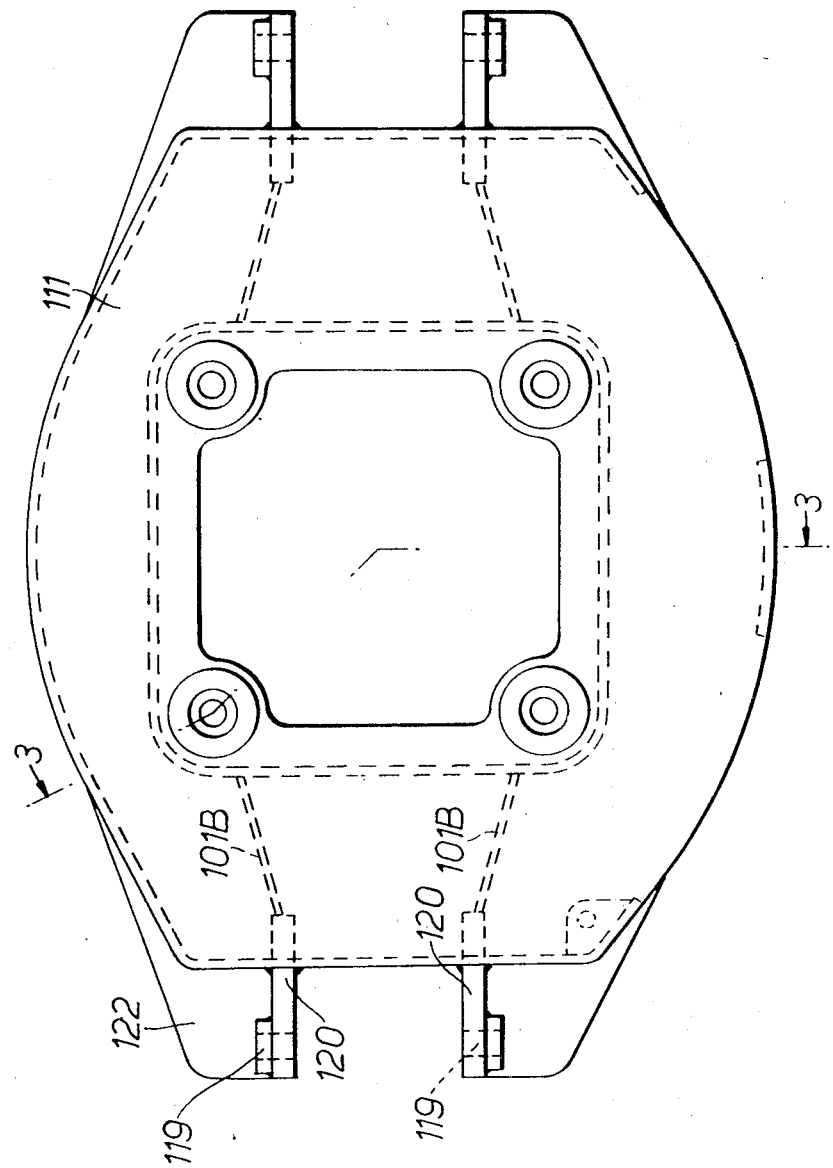

Patented Aug. 3, 1971
3,596,690
8 Sheets-Sheet 3
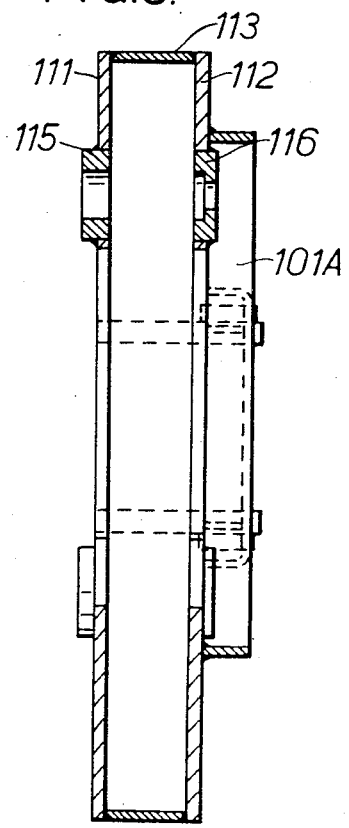
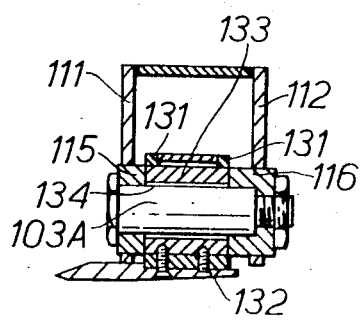
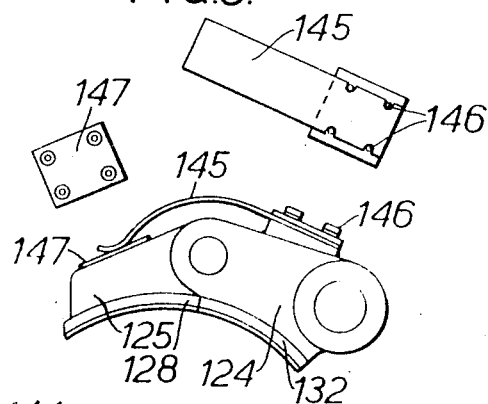
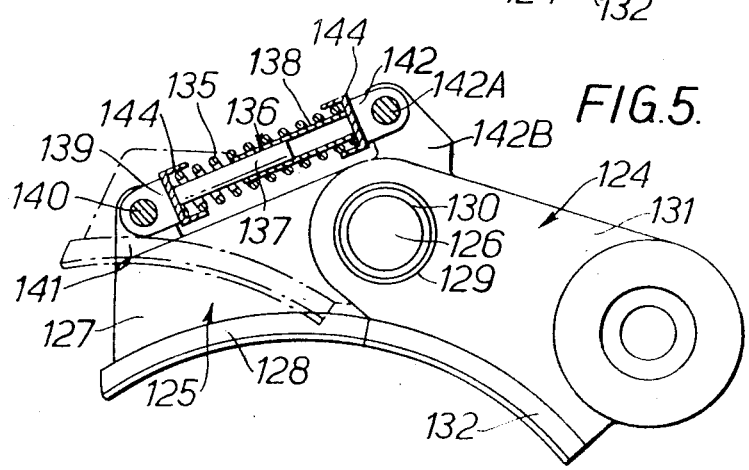
INVENTORS
DOUGLAS D. HAMILTON and JOSEPH J.R. BOIVIN
BY
Craig, Antonelli, Stewart & Hill
ATTORNEYS

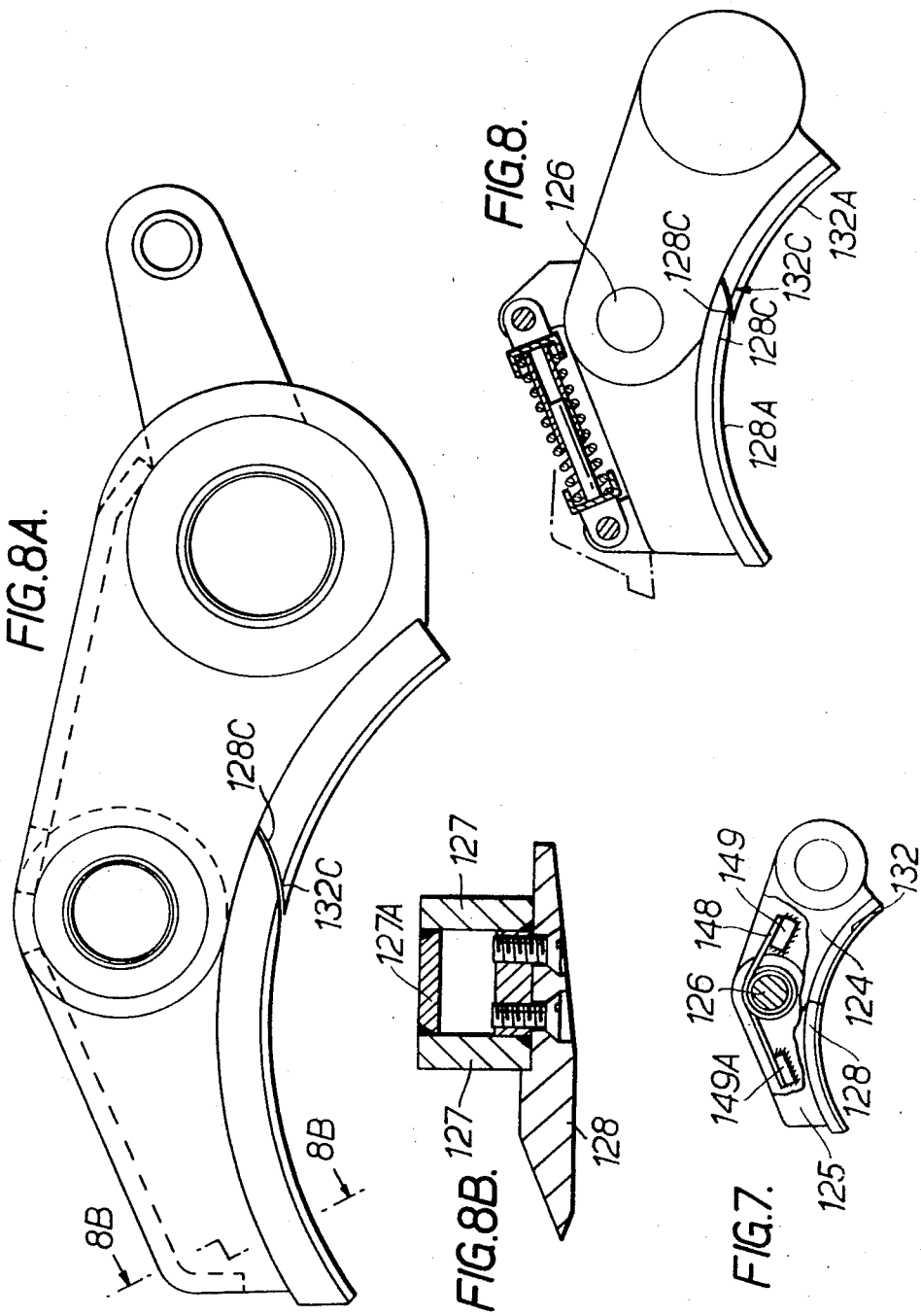

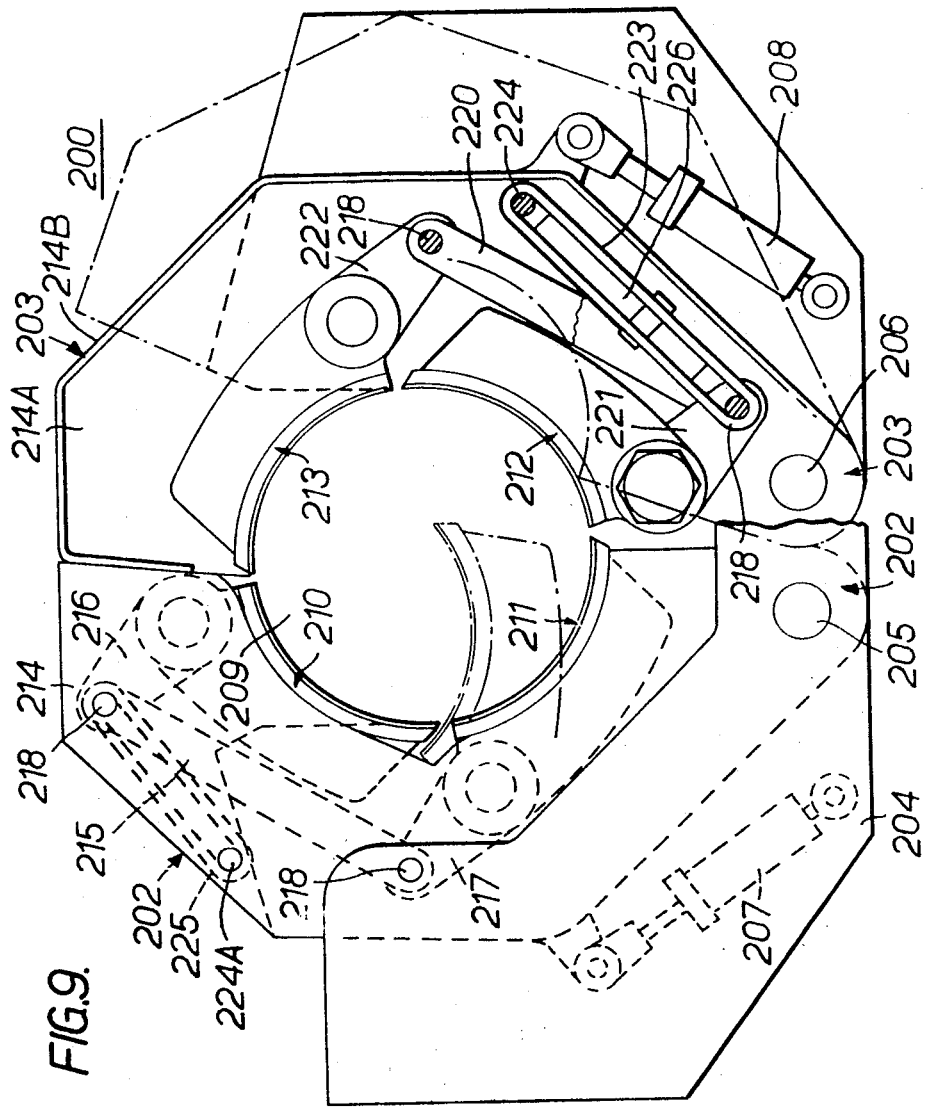

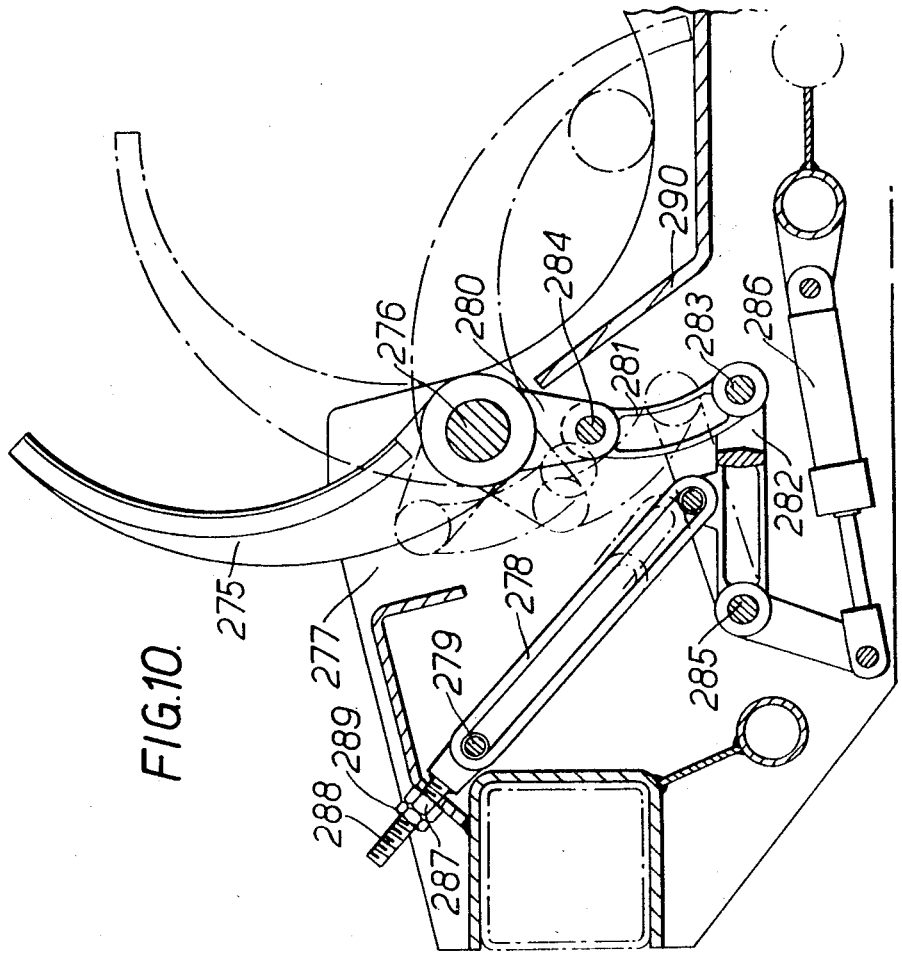

Patented Aug. 3, 1971

INVENTORS
DOUGLAS D. HAMILTON and JOSEPH J. R. BOIVIN
BY
Craig, Antonelli, Stewart & Hill
ATTORNEYS INVENTORS
DOUGLAS D. HAMILTON and JOSEPH J.R. BOIVIN
BY
Craig, Antonelli, Stewart & Hill
ATTORNEYS

DELIMBER CUTTERS, DELIMBER AND TREE PROCESSING FEED MEANS

This invention relates to an improved apparatus for delimbing trees and more particularly to delimbers of the stripper type which may also be referred to as an impact-cleavage type.

A number of delimber designs of the aforementioned type are known, as exemplified by U.S. Pat. No. 3,340,912 issued Sept. 12, 1967; U.S. Pat. No. 3,059,677 issued Oct. 23, 1962; U.S. Pat. No. 3,183,949 issued May 18, 1965; U.S. Pat. No. 3,348,952 issued Oct. 24, 1967; U.S. Pat. No. 2,882,941 issued Apr. 21, 1959; U.S. Pat. No. 3,183,952 issued May 18, 1965; and U.S. Pat. No. 3,183,951 issued May 18, 1965.

It will be noted that in some of the above patented structures, the tree is moved relative to the delimbing device while in others, the delimber device is moved relative to the tree. The cutting portion of the delimbing devices in some cases consist of chains while in others, arcuate fixed radius type cutters are used. With regards to the latter type, attempts have been made to segment the arcuate cutters and to pivot the same in such a manner as to enable the cutters to closely follow the tree which varies in diameter throughout its length. In this respect, some designs feature only two cutters, some three and one, in particular, shows four, namely U.S. Pat. No. 3,183,952. The latter design also includes a pin and slot guidance system for the cutters. Such arrangements have been found impractical in that flexing in the structure during usage causes binding of pins in the slots. Debris and the like tends to accumulate in such slots and further fouls the mechanism's operation.

The foregoing designs are adapted for delimbing trees of a particular size, rather than a range of sizes. It is, therefore, an object of the present invention to provide a delimber which effectively delimbs trees of varying diameters which range from small to large diameters in small increments.

A further objective of the present invention is to provide a delimber design which maintains the tree processing axis, (i.e. an axis along which the tree travels through the delimber during delimbing of the tree or in the case where the tree is stationary and the delimber is moved, the axis of the path along which the delimber moves) in substantially the same position relative to the fixed frame portion of the delimber during the delimbing operation regardless of the tree diameter. This is a particularly necessary feature for using the delimber in ganged relation with other processing units, such as a debarker and shear as, for example, described and illustrated in U.S. Pat. No. 3,351,107 issued Nov. 7, 1967.

A further important object of the invention is to provide a delimber of simple design for dependable operation and easy maintenance. In this respect, there is provided easy access for replacing individual cutters as and when the necessity arises.

It is another object to provide a delimbing means which is adaptable to multidirectional feeding, i.e. top, side, bottom, or variants in between as well as front feeding. In feeding from the top, side, or bottom, the tree is moved laterally, relative to its length, into the bight of the delimbing device while in front feeding the tree is propelled endwise. It has been concluded, in arriving at the present design, that a delimbing design which combines the wrap-around chain principle advantageous in terms of having as much cutter to tree contact as possible regardless of tree diameter and the advantage of robust segmented type cutters arranged in a manner so as to form an irislike aperture of bight through which the tree passes, is the most effective, practical and adaptable design to best meet the objects of the invention.

In accordance with one aspect of the invention, there is provided a tree processing machine comprising delimbing means and feeding means associated therewith, said delimbing means being of the impact cleavage type, the improvement comprising: a cutting means encircling the tree to be processed, said cutting means having means to vary an irislike aperture formed by said cutting means through which the tree passes, and wherein said cutting means includes cutting members each of which having a plurality of cutting edges, said cutting edges being movable with respect to one another.

In accordance with another aspect of the invention, there is provided a delimbing means adaptable to a variety of mountings, i.e. (a) mounted as previously indicated in tandem relation with other processing units including sets of powered feed rolls, such arrangement featuring front feeding of the tree or (b) mounted either on the free end of a boom or a mobile frame means, such arrangements featuring side feeding which is accommodated by the delimber frame having a pair of hinged portions controllably movable from an open to a closed position with respect to one another.

In accordance with a further aspect of the invention, there is provided a plurality of delimbing cutters pivotally mounted on a frame, each of said cutters comprising at least a pair of members having arcuate cutting edges, said members being pivotally connected for relative movement one to another and resiliently urged together so that said cutting edges define a substantially true radius, and including powered means to move said members towards and away from engagement with a tree to be or being processed.

This latter aspect permits the cutting member to approach tangentially varying diameters of trees, particularly sizes intermediate of the large and the small diameters. Three simple methods of urging the pairs of cutting members together are shown, namely a flat spring, a coil spring and a torsional type spring. Other suitable alternative means may be used.

A further aspect of the invention concerns the arrangement wherein feed rolls are employed to pull the tree through the delimber. Since it is desirable to prevent slippage and thus damage to the tree during the feeding operation, it is, therefore, important that the feed rolls exert sufficient pressure on the tree. This pressure demand is related to the size and number of limbs being severed by the delimber. Conversely, when the delimber work load is less, less pressure is required to be exerted by the feed rolls on the tree. The present invention includes an automatic hydraulic feed roll tension control, wherein the feed roll motor senses the load demand and accordingly, the hydraulic circuit pressure is increased or decreased to the feed roll tension cylinders.

Further objects will become apparent from the following description and drawings.

Various off-loading or collecting off-loading arrangements to handle the processed wood may be used in conjunction with the aforementioned apparatus, for example, conveyors or the like or other suitable means.

Various in-feed arrangements to the processing apparatus may also be used. These may include feed rolls or conveyors or the like, or other suitable means.

The invention is illustrated, by way of example, in the accompanying drawings wherein:

FIG. 1 is a front elevation of a delimber assembly in accordance with the present invention;

FIG. 2 is a front elevational view of the housing only for the delimber illustrated in FIG. 1;

FIG. 3 is a cross section along 3-3 of FIG. 2;

FIG. 4 is a section along 4-4 of FIG. 1;

FIGS. 5, 6 and 7 are part sectional elevational views of delimber cutter assemblies in accordance with the present invention showing alternative methods of urging the cutter members together;

FIG. 8 is a part sectional view of a modified delimber cutter;

FIG. 8A is a view similar to FIG. 8 but including more detail;

FIG. 8B is a section along 8B-8B of FIG. 8A;

FIG. 9 is a front part sectional elevation of a delimber assembly of alternate design to that shown in FIG. 1, in accordance with the present invention, showing in particular a two-part main frame and cutter link system;

FIG. 10 is a partial sectional elevational view, similar to that of FIG. 8, of the modified delimber;

Figure 11:
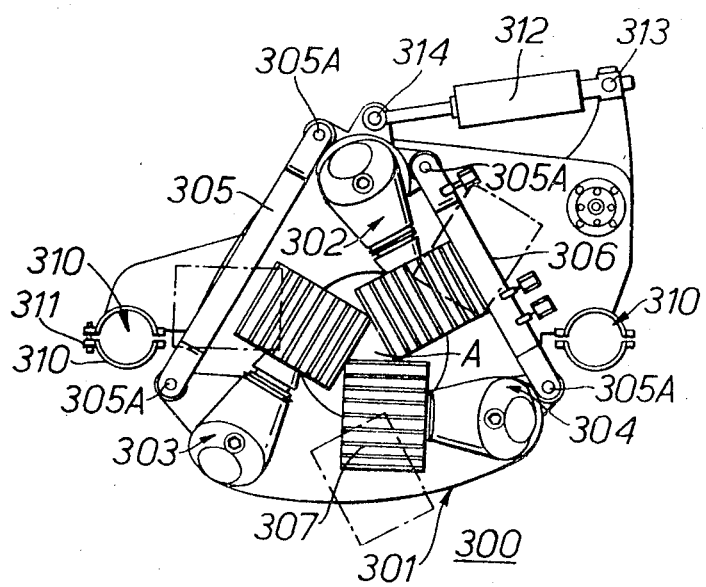
FIGS. 11 and 12 are front and side views respectively of feed rolls in accordance with a further aspect of the present invention.

Referring now in detail to the drawings, shown in FIG. 1 is a delimber assembly 100 comprising a housing or main frame 101 having cutting members 102, 103, 104 and 105, pivotally mounted thereon respectively by pins 102A, 103A, 104A and 105A. Link members 106, 107 and 108 interconnect respectively the cutting members 102—104; 104—105; and 105—103 for interrelating movement of the cutting members towards and away from the axis of an aperture 110 in the housing 101. Link member 106 is connected to the rod side of hydraulic cylinder 109 to provide the necessary power to move and retain the cutter members 102 to 105 inclusive in selected positions.

Figure 13:
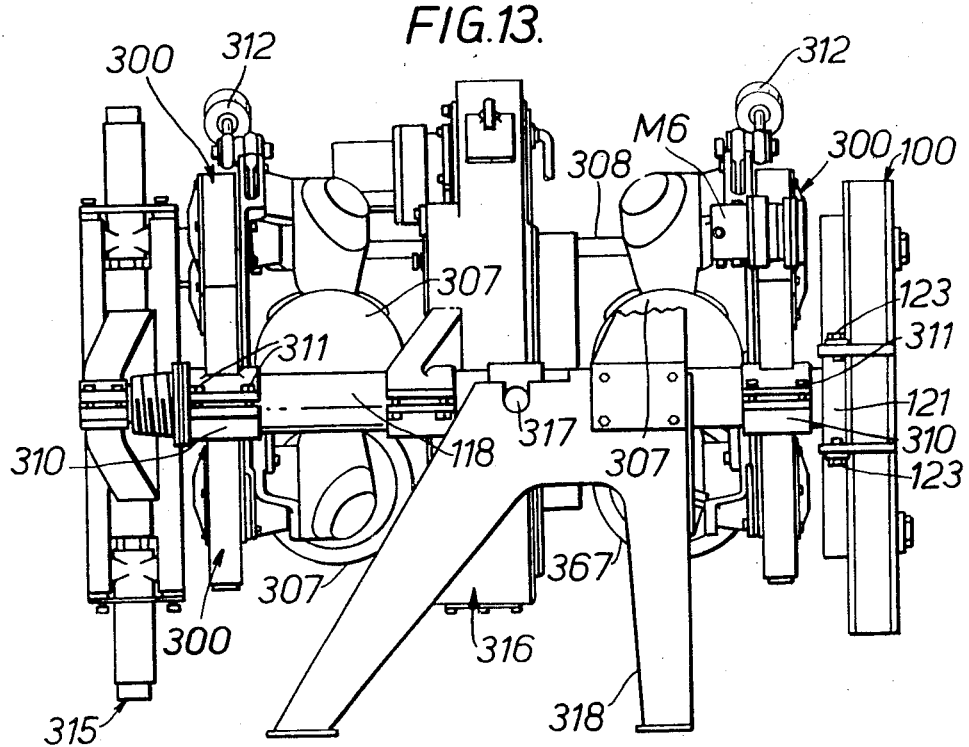
FIG. 13 is a side elevational view of a tree processing assembly comprising various processing units mounted in tandem alignment including delimber and feed roll units in accordance with the present invention.

The main frame or housing 101 may be of unit type construction as, for example, a box section shown in FIGS. 2 and 3 comprising a front plate 111 and rear plate 112 interconnected by a side plate 113. The main frame 101 may be mounted, for example, as shown in FIG. 13 wherein it is attached to a pair of parallel, horizontally spaced side rails 118 having other processing units secured thereto. Referring to FIGS. 1 and 2, there is provided a pair of apertures 119 formed by mounting lugs 120 at each of a pair of opposite sides of the housing for connecting to respective ones of a pair of mountings 121 (see FIG. 13) fixed to the side rails 118. Gussets 122 reinforce the mounting lugs 120 the latter of which accommodate hinge bolts 123 which project into recesses in the mountings 121. Bosses 115 and 116 are welded in axial alignment to front and rear plates 111 and 112 respectively to accommodate pivotal mounting of the cutting members 102 to 105 inclusive. The main frame 101 may be further reinforced by weldments such as gusset plates 101A and 101B or the like.

Each of the cutting members 102 to 105 inclusive are articulated members and in the embodiment illustrated include a first member 124 and a second member 125 pivotally connected by a pin 126 or the like suitably retained in position. Members 124 and 125 are of similar construction. Member 125 consists of a pair of plates 127 secured in spaced relation along one edge to a cutting blade 128 and interconnected along the other edge by a plate 127A. Plates 127 are further connected by a bearing housing or sleeve secured to plates 127 by welding or the like. A bearing is located within the bearing housing and retained therein, for example, by force fit, such bearing receiving pivot pin 126 for pivotally interconnecting members 124 and 125. Member 124 consists of a pair of plates 131 secured in spaced relation to a cutting blade 132 and has a bearing housing or sleeve 133 secured to plates 131 by welding or the like. A bearing 134 is fitted within bearing housing 133 and retained by force fit, retaining rings or the like bearing 134 receiving mounting pivot pin 103A, 102A, 104A or 105A as the case may be. Cutting blades 128 and 132 have cutting edges which conform to a common radius from a given point when in a selected pivotal position. The pair of plate members 131 disposed in spaced relation relative to one another form a clevis to accept plate members 127 therebetween, and as mentioned, members 124 and 125 are pivotally interconnected by the pin 126. Reinforcing bosses such as those indicated by reference numeral 129 in FIG. 5 may be secured to plates 131, if desired, to provide improved bearing support for pin 126, the latter of which may, for example, be retained in assembled relation by a "C" clip 130.

The cutting members 124 and 125 are resiliently biased relative to one another about the pivot 126 interconnecting the same and in FIGS. 5, 6 and 7, there are shown three alternative methods which may be used. In FIG. 5, there is illustrated a compression coil spring 135 circumscribing an internal guide 136 consisting of a pin 137 and tube 138, the latter of which is connected respectively to members 125 and 124. Pin 137 has a lug 139 at one end thereof to provide a detachable connection to member 125 by a pin 140 retained in a lug 141 secured to member 125. The tube 138 has a lug 142 at one end thereof to provide a detachable connection to member 124 by a pin 142A and lug 142B. Pin 137 and tube 138 are arranged in telescopic relation whereby members 124 and 125 are permitted to pivot relative to one another about pin 126. Spring retaining end collars 144, are secured to lugs 139 and 142 and the spring 135 is interposed between the same. Relative pivotal movement of members 124 and 125 about pivot pin 126 will compress the spring thus resisting such movement. A stop provided by abutment of blades 127 and 128 limits movement of members 124 and 125 in the opposite direction, thus maintaining desired minimum tension in the spring.

In FIG. 6, there is illustrated a flat spring 145, secured to member 124 by cap screws 146, which applies pressure on a wear plate 147, secured by screws 150 to member 125, to urge the members together.

In FIG. 7, there is illustrated a torsion type spring 148 wound around pin 126 and adapted to react against bearing blocks 149 and 149A secured respectively to members 124 and 125 in suitable locations and by suitable means. Springs 145 and 148 may be used individually or in combination.

Referring to FIG. 1, it will be seen that movement of the cutting members 102 to 105 inclusive in a direction towards the axis aperture 110 will, upon contact with substantially circular objects of varying midrange diameters, cause relative movement between members 124 and 125 so as to provide improved cutter contact with the substantially circular objects.

As previously mentioned, link members 106, 107 and 108 interconnect the cutting members to synchronize movement of the same. Link member 106 is connected at opposite ends to lugs 151 and 152 respectively secured to cutting members 102 and 104 by respective ones of a pair of pins 157. Link member 107 is similarly connected to cutting members 104 and 105 by lugs 153 and 154 and a pair of pins 157. Link member 108 is similarly connected to cutting members 105 and 103 by lugs 155 and 156 and a pair of pins 157. Hydraulic cylinder 109 is mounted within the main frame assembly 101 and pivotally connected thereto by pin 158 suitably retained in position. The rod end of the hydraulic motor is connected to link member 106 by pin 159 suitably retained in position. Hydraulic motor 109 is a double acting type and thus provides means forcibly to move cutting members 102 to 105 inclusive towards and away from the axis of the aperture 110.

The cutting members 102 to 105 inclusive each consist of two pivotally interconnected parts 124 and 125 and, as illustrated in FIG. 1, there is, in some relative positions of members 124 and 125, a gap between the adjacent edges of cutting blades 132 and 128 secured respectively to the cutting members 124 and 125. The gap varies depending upon the relative pivotal positioning of members 124 and 125; FIG. 5 illustrating in phantom member 125 pivoted to its outermost position where there is a relatively large gap. During delimbing of trees, this gap may have a tendency to collect debris in which case cutter member 125 is unable to pivot to its normal rest position. In order to overcome this difficulty, there is illustrated modified cutting members in FIGS. 8 and 8A where the adjacent blades on cutting members 124 and 125 are appropriately shaped so as to remain in overlapping relationship during relative movement of members 124 and 125 about pivot pin 126.

Referring to FIG. 8, cutting blades 128A and 132A are illustrated and are similar in every respect to cutting blades 128 and 132 respectively previously described, except for the edge contours adjacent one another. Blades 128A and 132A have respective edges 128C and 132C adjacent one another which are disposed in overlapping relationship with respect to one another. Edge 128C is convex and meets with edge 132C which is concave about a common radius from the axis of pivot pin 126. It will be readily apparent that such arrangement avoids a variable sized gap between the adjacent edges during relative pivotal movement of cutter members 124 and 125 as is the case with respect to the embodiment illustrated in FIG. 5. Avoiding the variable sized gap tends to prevent entrance of debris which otherwise may accumulate and prevent the proper abutment of the adjacent cutter blade edges. The arcuate blade edges 128C and 132C are preferably of such a length as to provide overlapping relationship throughout the full range of relative pivotal movement of the cutting members 124 and 125 about the pivot pin 126.

The articulated cutting members previously described and illustrated consist of two members pivotally interconnected. The purpose of utilizing articulated members is to enable varying the radius of curvature of the cutting edge so that the cutting edge can closely follow the peripheral surface of a tree trunk or trunks of varying diameters. The cutting members may consist of two pivotally interconnected members, i.e. two segments as illustrated or alternatively three, four or even more segments may be used connected in end-to-end relation.

An alternative embodiment of the delimber is illustrated in FIG. 9 and referring to the same, there is illustrated a delimber 200 comprising a pair of frame members 202 and 203 pivotally connected to a frame 204 respectively by pins 205 and 206. Frame members 202 and 203 are movable relative to each other by actuation respectively of hydraulic cylinders 207 and 208. Selected movement of members 202 and 203 from a closed position (i.e. free ends in abutting relation) to an open position permits entry of a tree therebetween into the bight thereof or central opening by lateral movement of the tree as opposed to endwise movement as is the case in respect of the delimber shown in FIG. 1.

A plurality of cutting members 210, 211, 212 and 213, which may be single element members as illustrated, or multipart as previously described cutting members 102 to 105 inclusive (except for the link lug positions), are pivotally secured to the frame members 202 and 203. The cutting members 210 to 213 inclusive may be mounted on frame members 202 and 203 in similar fashion as cutting members 102 to 105 inclusive are mounted to main frame 101, except in the instant embodiment, two are mounted on frame 202 and the other two on frame 203.

Frame members 202 and 203 are of similar construction to main frame 101. Frame members 202 and 203 consist of a front plate 214, a rear plate 214A and an end plate 214B. Frame members 202 and 203 may be further reinforced with gussets and the like. Frame 204 may have similar mounting attachments as main frame 101 as described previously for attaching the delimber to a pair of side rails 118 as shown in FIG. 13.

An alternative system for pivotally moving the cutting members is shown in FIG. 9 and features simpler hydraulics to that disclosed previously. Cutting members 210 and 211 are interconnected by a link member 215 attached to respective lugs 216 and 217 by respective ones of a pair of pins 218 suitably retained in position. Cutting members 212 and 213 are similarly interconnected by a link member 220 attached to lugs 221 and 222 by respective ones of a pair of pins 218 suitably retained in position. The alternative system includes a rubber band or the like tensioning member 223 secured to, and tensioned between, the pin 218 and a pin 224 secured to the frame 203 to urge cutting members 212 and 213 towards the axis of the aperture 209 in the frame. Cutting members 210 and 211 are similarly moved by a rubber band or the like tensioning member 225 secured to, and tensioned between, the pin 218 in lug 216 on cutting member 210, and a pin 224A secured to the frame 202. Also included are respective ones of a pair of single acting hydraulic cylinders 226 connected by suitable means to pins 218 and 224 and pin 218 and 224A and when actuated provides movement for the cutting members 210 to 213 inclusive in a direction opposite to that provided by the tensioned rubber bands 223 and 225. If desired, two resilient bands 223 and two resilient bands 225 may be used, in which case the hydraulic cylinders are preferably mounted between the respective pair of bands.

The link system in this embodiment differs from the previous one for particular reason of having a two-piece main frame, the prime purpose being to provide the feature of multidirectional introduction of a tree to be processed, into the delimber. Pivoting frame members 202 and 203 to an open position opens the jaw provided by such members whereby a tree may be inserted laterally, relative to its length, into the bight or aperture 209 of the delimber.

In FIG. 10, there is illustrated a still further embodiment of a delimber wherein a pair of stripping arms 275 (only one is shown on the left-hand side) are pivotally attached by respective ones of a pair of pins 276 to a frame member 277. The stripper arms 275 are resiliently urged inwardly toward one another by a rubber band or the like resilient member 278 anchored at one end by a pin 279 to the frame 277 and at the other end through a linkage mechanism to a lug 280 on the cutter arm. The linkage includes a member 281 and a member 282 pivotally interconnected by a pin 283 and secured at their opposite ends respectively by pins 284 and 285 to the lug 280 and the frame 277. Movement of the stripper delimber arms 275 to an open position may be effected by respective ones of a pair of single acting hydraulic cylinder 286, pivotally connected at opposite ends respectively to the frame 277 and the linkage mechanism. Tension in the resilient belt member 278 may be adjusted by turning a nut 287 on a threaded shaft 288 connected to the pin 279. The nut 287 bears against a portion of the frame 277 and may be locked in position by a lock nut 289. The frame 277 may consist of a front and rear plate interconnected by various struts 290 illustrated in cross section in FIG. 10.

Although delimber assembly 200 is specifically designed to introduce a tree laterally into the delimber aperture from a direction normal to the longitudinal axis of the tree, it may, however, be used by introducing the tree endwise as is the case with respect to delimber 100.

Referring to FIG. 13, there is illustrated a tree processing assembly consisting of a flying shear unit 315, a debarking unit 316 and a delimber unit 100 all mounted in tandem alignment with two feed roll assemblies 300, one of which is disposed between the delimber and the debarker and the other between the debarker and the shear. The processing units and feed roll assemblies are secured to and located between the side rails 118 which, in turn, are pivotally mounted by a pair of trunnions 317 on a support 318. The construction and operation of shear unit 315, debarker unit 316, and the mounting on side rails 118 are more fully described in the aforementioned U.S. Pat. No. 3,351,107.

Referring to the arrangement shown in FIG. 13 in operation, a tree to be processed is fed, by suitable means, butt end first through the open aperture of delimber assembly 100 to contact feed rolls 307 of the first feed roll assembly 300. Immediately thereafter, cutting members 102 to 105 inclusive of delimber assembly 100 close by actuation of hydraulic cylinder 109 and are tensioned against the tree by the rubber bands 223 and 225 in one embodiment and by hydraulic cylinders 109 in the other embodiment. For this purpose, an accumulator (not shown) may be used. Feed rolls 307 are set in motion to propel the tree endwise through the delimber assembly 100 during which time the blades 128 and 132 remove the limbs therefrom. Obviously delimber 200, previously described or the delimber illustrated in FIG. 10 may be substituted for delimber 100 in the tree processing assembly.

Figure 12:
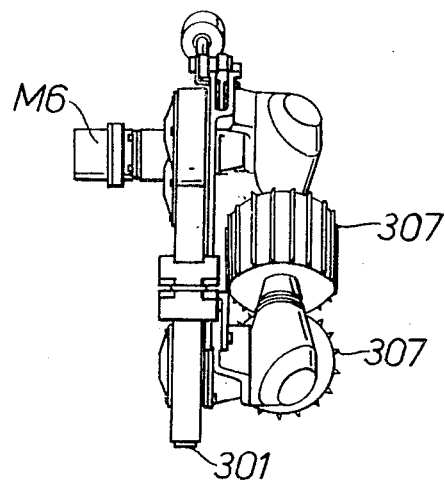
Figure 14:
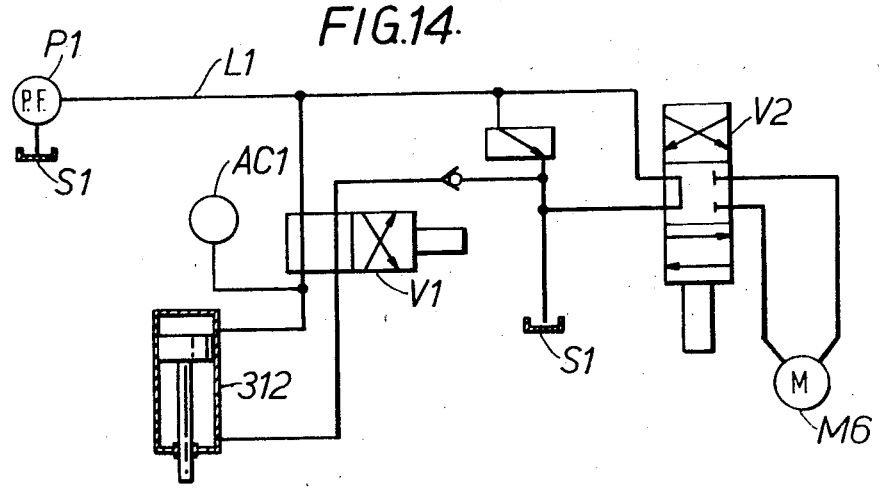
FIG. 14 is a hydraulic flow diagram illustrating the feed roll tension control device in accordance with the present invention.

The feed roll assemblies include driven rolls for contacting and propelling the trees endwise. The rolls are brought into and out of engagement with the trees and in accordance with a still further aspect of the present invention, there is provided modifications for controlling movement of feed rolls, the feed rolls being of the type disclosed in Canadian Pat. No. 807,454 issued Mar. 4, 1969. Feed rolls, as disclosed therein, are utilized to propel a tree endwise through a series of processing units. In accordance with the present invention, there is provided means for tensioning the feed rolls onto the tree responsive to force requirements necessary to propel the tree being processed. Referring to FIGS. 11 and 12, there is illustrated a feed roll assembly 300 comprising a frame 301 having three feed roll arm assemblies 302, 303, and 304 pivotally mounted thereon and which are interconnected for synchronized movement by link arms 305 and 306 pivotally attached thereto by pins 305A. A hydraulic motor M6 provides power for driving the feed rolls 307 through a series of drive trains including sprockets, chains, and bevel gearing enclosed within the frame 301 and feed roll arm assemblies 302, 303 and 304. Drive motor M6 may further be connected by a drive shaft 308 to provide power to the second feed roll assembly mounted in tandem alignment with other processing units as illustrated in FIG. 13. Mounting attachments 310 are incorporated in frame assembly 301 to provide detachable connection to side rails 118 by bolts 311. Power means for movement of the feed roll arm assemblies 302, 303 and 304, synchronized by the link arms 305 and 306, is provided by hydraulic cylinder 312 pivotally connected to frame assembly 301 by pin 313 and to the feed roll arm assembly 302 by pin 314. Hydraulic cylinder 312 is connected to a hydraulic circuit as shown in FIG. 14, i.e. to a fluid pressure supply pump P1 by a line L1 through a valve V1. An accumulator AC1 is interposed between the valve V1 and the cylinder 312. Line L1 is also connected to a valve V2 controlling fluid to and from motor M6 which drives the feed rolls. Fluid returns to the supply container in sump S1 through conduits suitably connected to the valves V1, V2 and to the pressure supply pump P1. Valve V2 controls the motor M6 and when positioned to cause motor M6 to drive the feed rolls, fluid to the motor M6 is then connected through valve V1 to the hydraulic cylinder 312. The demand on motor M6 for power to propel the tree will be reflected in fluid pressure to the cylinder 312 and it is connected such that an increase in the demand of power in motor M6 causes the feed roll arm assemblies 302, 303 and 304 to be pressed with greater force inwardly against the tree being propelled. Accordingly, the feed rolls 307 are tensioned onto the tree being propelled in proportion to the rotational forces on the feed rolls 307 utilized and required to propel the tree.

Power for operating the various processing units is supplied by hydraulic pumps driven by a prime mover and controlled by suitable flow control valves none of which is shown and is well known to anyone skilled in the art to which the present apparatus relates.

We claim:
1. In a machine of the type having a feeding means adapted to make and break pressure contact with a workpiece and also adapted to move said workpiece relative thereto, means for increasing and decreasing the contact pressure of said feeding means on said workpiece, and means interrelating said contact pressure and the force necessary to move said workpiece by said feeding means.

2. In a tree processing machine including one or more processing units and feed means for propelling trees longitudinally through said processing unit or units, said feed means comprising at least one feed roll tractively engageable with the surface of said trees, means for selectively moving said feed roll towards and away from a tree or trees to be propelled thereby through said processing units, means to increase or decrease the contact pressure of said feed roll on the tree being propelled, and means interrelating said contact pressure and the force necessary to propel the tree.

3. The apparatus as defined in claim 2 wherein the means to increase or decrease the pressure by said feed roll includes hydraulic means.

4. A machine as defined in claim 2, wherein said feed roll is driven by a first hydraulic motor and is movable into and out of engagement with the work piece by a second hydraulic motor, and means supplying fluid pressure to said second motor in response to powered demand of said first motor.

5. A tree processing assembly comprising in combination:
 a. at least one processing unit having a selected feed path along which a tree travels endwise during processing thereof;
 b. at least one driven feed means mounted on said assembly to pivot about a selected axis;
 c. means for moving said feed means toward and away from selected path for tractively engaging a tree located therein;
 d. first power means for driving said feed means to propel a tree engaged thereby;
 e. second power means for moving said feed means; and
 f. means interrelating movement of said feed means and driving force on the same increasing pressural contact of the feed means on the tree in response to an increase in power required to propel the tree engaged thereby.

6. A tree processing assembly as defined in claim 5, wherein said driven feed means comprises at least two feed rollers rotatable about axes substantially perpendicular to said feed path.